United States Patent
Knoy, Jr. et al.

(10) Patent No.: US 6,652,945 B2
(45) Date of Patent: Nov. 25, 2003

(54) METHOD OF MANUFACTURING A STACK OF SPACED LITES

(75) Inventors: Donald Lee Knoy, Jr., Wheatland, IN (US); Aaron M. Bauer, Vincennes, IN (US); Robert A. Moss, Vincennes, IN (US)

(73) Assignee: Gemtron Corporation, Sweetwater, TN (US)

( * ) Notice: Subject to any disclaimer, the term of this patent is extended or adjusted under 35 U.S.C. 154(b) by 61 days.

(21) Appl. No.: 09/797,715

(22) Filed: Mar. 5, 2001

(65) Prior Publication Data

US 2001/0009230 A1 Jul. 26, 2001

Related U.S. Application Data

(62) Division of application No. 09/138,540, filed on Aug. 24, 1998, now Pat. No. 6,220,437.

(51) Int. Cl.[7] .................................................. B32B 3/16
(52) U.S. Cl. ...................... 428/40.1; 206/460; 206/820; 283/81; 428/42.1; 428/42.2; 428/42.3; 428/43
(58) Field of Search ............... 428/40.1, 42.1, 428/42.2, 42.3, 43; 283/81; 206/820, 460

(56) References Cited

U.S. PATENT DOCUMENTS

| | | |
|---|---|---|
| 682,062 A | 9/1901 | Haberstroh |
| 693,514 A | 2/1902 | Haberstroh |
| 1,210,230 A | 12/1916 | Stringer |
| 1,256,818 A | 2/1918 | Nile |
| 2,170,147 A | 8/1939 | Lane |
| 2,476,145 A | 7/1949 | Gwyn et al. |
| 2,992,747 A | 7/1961 | Atkeson |
| 3,385,462 A | 5/1968 | Deldime et al. |
| 3,580,119 A | 5/1971 | Witherington-Perkins |
| 3,723,312 A | 3/1973 | Hay, Jr. |
| 3,958,051 A | * 5/1976 | Smith .................... 428/42.1 |
| 4,127,683 A | 11/1978 | Flemer et al. |
| 4,150,183 A | * 4/1979 | Reed .................... 428/42.1 |
| 4,807,743 A | 2/1989 | Yasuda |
| 4,895,746 A | 1/1990 | Mertens |
| 4,899,880 A | 2/1990 | Carter |
| 5,401,547 A | 3/1995 | Blackwell et al. |
| 5,451,457 A | 9/1995 | McCurdy et al. |
| 5,644,898 A | 7/1997 | Shepherd et al. |
| 5,725,956 A | 3/1998 | McCurdy et al. |
| 5,921,393 A | 7/1999 | Diederich |

FOREIGN PATENT DOCUMENTS

| | | |
|---|---|---|
| DE | 21 57 567 A | 6/1972 |
| EP | 0 334 832 A | 9/1989 |

* cited by examiner

Primary Examiner—Nasser Admad
(74) Attorney, Agent, or Firm—Diller, Ramik & Wight

(57) ABSTRACT

This disclosure relates to the manufacture of lites (glass sheets) which have at least a pair of thin spacers applied thereto which maintain the lites in spaced relationship when stacked upon pallets, wrapped and shipped. The spacers are preferably only partially adhered to the lites, either by weak bonding adhesive or electrostatically, and can be readily removed during end-use applications. The spacers are applied automatically during production runs of the lites, and the spacers are applied from above or from below relative to the path of travel of the lites.

24 Claims, 9 Drawing Sheets

METHOD OF MANUFACTURING A STACK OF SPACED LITES

CROSS-REFERENCE TO RELATED APPLICATION

This application is a divisional application of Ser. No. 09/138,540 filed on Aug. 24, 1998, and now U.S. Pat. No. 6,220,437.

BACKGROUND OF THE INVENTION

1. Field of the Invention

The present invention relates to the manufacture of lites (glass sheets or glass panels) which are eventually stacked in relatively intimated, though spaced, relationship to each other.

2. Description of the Relevant Art

It is conventional to stand lites/glass sheets on edge substantially vertically and interleave a sheet of paper, such as craft paper, between the sheets. Such sheets are generally stacked upon a pallet and are enclosed by a relatively strong polymeric/copolymeric film, such as relatively transparent or translucent polyethylene film. The interleaved sheets of paper function to impede corrosion of glass, prevent scratches and damp shocks, thereby safeguarding the glass sheets, which otherwise may be broken or cracked by relative movement/collision therebetween, as when such stacked and palletized sheets are transported to an end user.

Interleaving a sheet of paper between glass lites has in the past been done manually and is, therefore, time-consuming and costly from a production standpoint.

U.S. Pat. No. 4,807,743 acknowledges the function of such paper sheets to impede corrosion of glass, prevent scratches, damp shocks and prevent glass sheet/lite breakage. However, this patent also recognizes that moisture which is absorbed by such large paper sheets can create chemical reactions with the glass which produce paper stains on the glass surfaces. Wrinkle patterns from the paper sheets are said to be transferable to the lites thereby rendering the same less attractive. Glass quality is also said to deteriorate as a result of surface weathering of the glass sheets due to moisture absorption by the paper sheets, particularly under high humidity conditions under which water droplets may form and drip upon the lites. This patent suggests as one solution to these problems the same conventional utilization of craft paper as spacer material, but associated therewith are bodies of desiccant material housed within an overwrap of the stacked glass. The overwrap is a polyethylene film having low water vapor transmission characteristics. While this patent proposes solutions to several problems, its disclosure is silent with respect to the continued conventionality of utilizing large sheets of paper as spacers between adjacent pairs of lites.

Another approach to protecting sheets of material against damage during stacking or packaging is found in U.S. Pat. No. 3,385,462 which first acknowledges the interposition of loose materials, such as straw, wool fiber and sawdust, between sheets of glass when they are packed for transportation, or to interpose sheets of relatively soft material, such as paper or corrugated cardboard. However, the patent goes on to state that these methods do not prevent surface damage to the sheets which may in some cases make them useless, particularly if they are of a very high quality glass or have been specially surface treated. This patent proposes the utilization of a plurality of spacing members, such as pads of polyurethane having coatings of pressure-sensitive adhesive on the opposite faces which contact the glass sheets. An alternative approach is the utilization of spacing members each having a head portion formed as a suction member and a stem portion which is relatively flat. Such pads or spacer members are positioned between the glass sheets. These spacers are costly because of the intricate configuration thereof and the amount of material associated with each, not to mention the high productivity costs involved in manually locating a plurality of such spacers between adjacent glass sheets.

U.S. Pat. No. 2,992,747 avoids the utilization of individual spacers of any type, yet protects the surfaces of glass sheets that are stacked together for storage, shipment or other handling by spraying or applying parting material, with or without filler, upon surfaces of the sheets to maintain the same spaced when in stacked relationship. Such parting material coatings adhere to the glass sheet surfaces and provide suitable space between adjacent surfaces of the stacked glass sheets. Problems associated with such protection involve air quality standards during application, but more importantly remains the end use task of removing the coatings incident to the utilization of the glass sheets.

U.S. Pat. No. 2,476,145 suggests electrostatically charging glass sheets as they travel along a conveyor through the utilization of a silk cloth roll. Each glass sheet is thereby electrostatically charged. The electrostatically charged glass sheets are conveyed through an atmosphere filled with wood flour which causes the particles of flour to be attracted to the charged surfaces of the glass sheets in a relatively thin uniform layer. By negatively electrostatically charging the wood flour, the latter will be attracted and retained for a sufficient time to achieve stacking and wrapping of the glass sheets.

SUMMARY OF THE INVENTION

The invention is directed to a novel method of manufacturing a stack of lites (glass sheets or plates) in spaced relationship to each other to thereby prevent damage, particularly during shipment. The lites are successively fed along a first path of travel and thin spacers are fed along a second path of travel with the paths of travel converging toward an area of merger at which the thin spacers are adhered to the lites. The lites are thereafter stacked with the thin spacers sandwiched between adjacent pairs of the lites.

The thin spacers are carried by a ribbon formed of first and second relatively narrow strips of material. First surfaces of the two strips of material are in surface-to-surface abutting relationship, and a plurality of unending preferably circular cut lines are formed substantially through the first strip of material to set-off successive spacers which are carried by the second strip of material after removal of first strip waste material. Each spacer has associated therewith indicia means for activating a sensor to effect timed removal of the spacers from the second strip and the timed transfer thereof to an associated lite. The sensor activating means is preferably a dark line or bar of printed indicia associated with each spacer which is conventionally sensed to control ribbon feed in timed relationship with edge sensing of the conveyed lites. Preferably, at least two spacers are applied to each lite with one spacer being applied relative to leading edge sensing of the lite and the second spacer being applied responsive to trailing edge sensing of the lite. After each lite has applied thereto at least two such spacers, the lites are stacked upon a pallet, are appropriately wrapped in conventional film, and can be readily transported absent deterioration or damage because of the protection afforded by the spacers.

In further accordance with this invention, the relatively thin spacers are designed not only for spacing and thereby protecting the lites, but perhaps as importantly is the fact that the spacers can be readily removed incident to end use applications. For example, the lites can be glass shelves for refrigerators which are shipped from the lite manufacturer/fabricator in stacks to the refrigerator manufacturer. Each thin spacer must be readily removed by the manufacturer or the eventual end user, namely, the retail purchaser. To the latter end the spacers each include first and second surface areas which contact an associated lite. The first surface area of each spacer is in substantially adhering relationship to the lite, while the second surface area is in substantially nonadhering relationship to the lite. Therefore, the adhered first surface areas function to retain the spacers in position upon the lites during fabrication, stacking and shipment, while the second surface areas permit the spacers to be readily grasped and removed from the lites, either by the end use manufacturer or the end use retail user.

Preferably, each first surface area of each spacer possesses either adhesive characteristics or static cling (electrostatic) characteristics. In the first case, each spacer is preferably made of paper and includes on its first surface area a relatively weak bonding adhesive, while the second surface area excludes adhesive. Alternatively, both the first and second surface areas may be provided with a weak bonding adhesive, but the second surface areas are covered with a very thin covering, such as a thin piece of paper. In such case, the thin piece of paper or tab prevents the second surface areas from adhering to the lites and facilitates subsequent end use removal.

In lieu of the paper spacers, the spacers may also be made of material possessing static cling characteristics (electrostatically adherent to glass). Static cling vinyl or similar polymeric/copolymeric material is preferably utilized, and absent other provisions, each such static cling vinyl spacer readily adheres to an associated lite. However, the adherence is so relatively dramatic that difficulties could be encountered unless otherwise provided for, as, for example, difficulty of end-use removal, difficulty of glass separation, and the like. Accordingly, a first surface of each spacer includes a first surface area which possesses static cling or electrostatic adhering characteristics for adhering each spacer to an associated lite, but an adjacent second surface area is covered by a thin tab of nonadhering material, such as thin paper, which prevents such adherence. Thus, each spacer is electrostatically adhered to the lite at its first surface area, yet can be readily removed by grasping the second surface area/tab. Spacer transfer between stacked lites is prevented by coating each spacer opposite second surface with a U.V. coating or its equivalent which kills or suppresses static and prevents spacer transfer between adjacent stacked lites.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
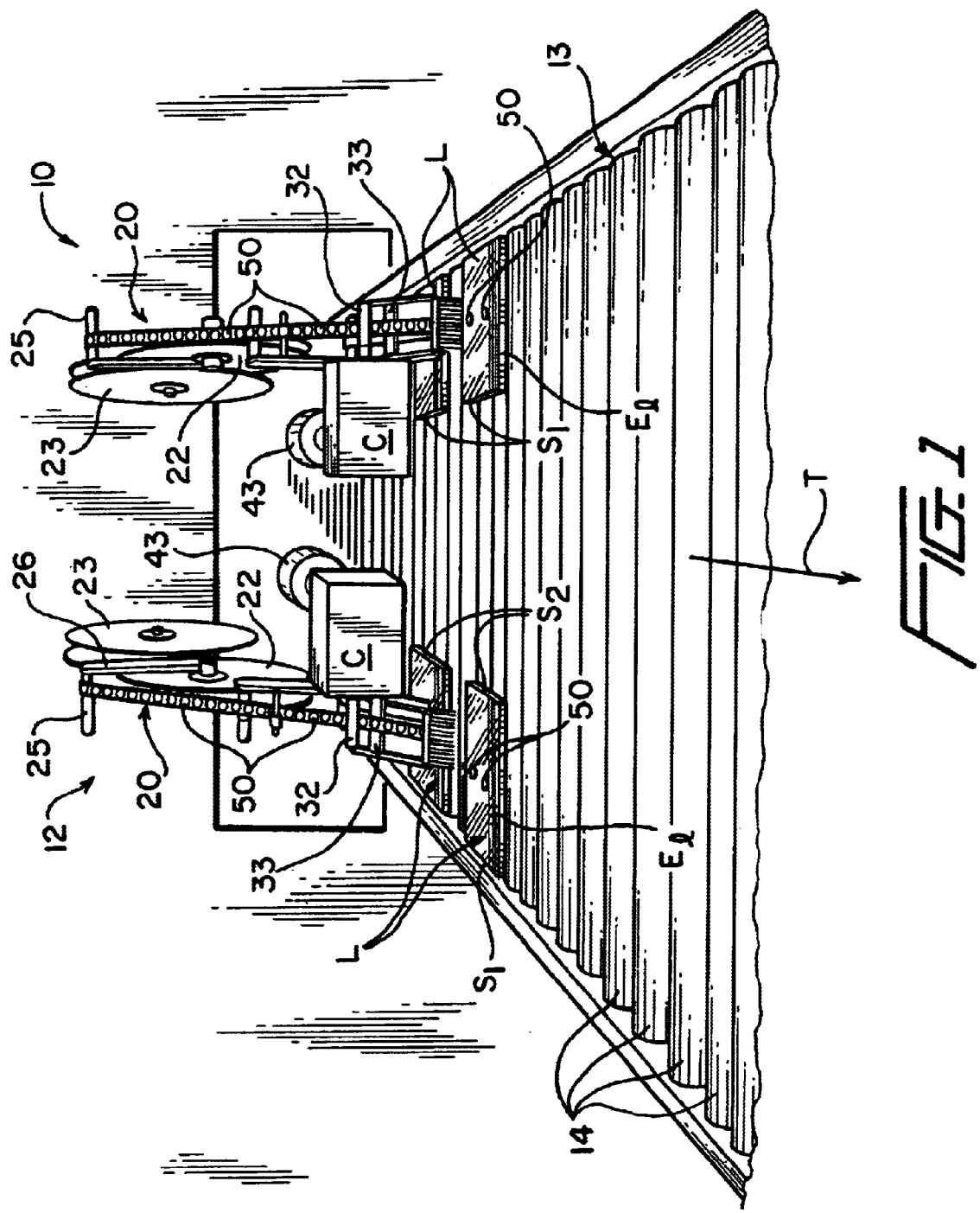
FIG. 1 is a front schematic perspective view of a pair of relatively identical machines, and illustrates each machine feeding a ribbon or a carrier having adhered thereto relatively thin spacers for the individual transfer of the thin spacers to upper surfaces of lites.
Figure 2:
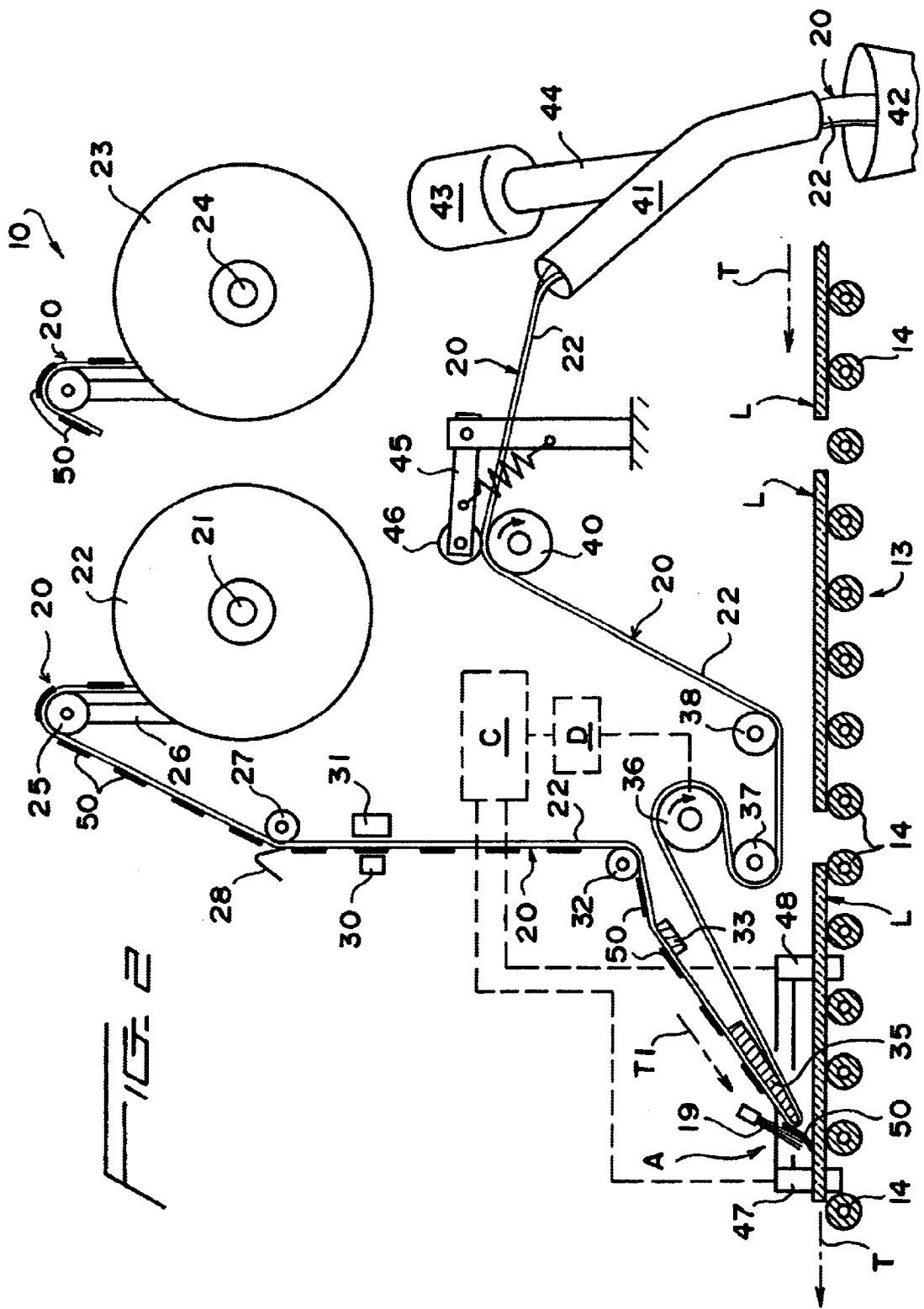
FIG. 2 is a side schematic elevational view of one of the two machines of FIG. 1, and illustrates the manner in which the ribbon and thin spacers are fed along a first path of travel toward a merger area at which the thin spacers are transferred to upper surfaces of lites fed along a second path of travel.

A machine 10 is illustrated in FIG. 1 of the drawings adjacent a substantially identical machine 12 which are conventionally supported above a conveyor 13 having a plurality of conveyor rollers 14 driven to convey or feed a plurality of identical lites (glass sheets or plates) L in a first direction along a first path of travel which in FIG. 2 is from right-to-left and is generally designated by the headed arrow T. As is best illustrated in FIG. 1, the lites, sheets or plates L are of a substantially rectangular configuration, and though illustrated as being substantially the same size, the lites L associated with the machine 10 can be larger or smaller than the lites L associated with the machine 12. Alternately, a relatively large lite spanning the width of the conveyor 13 can be fed along the path of travel T and each such relatively large single lite can be operated upon by both of the machines 10, 12. However, for the purposes of this description, the machine 10 will be described in association with the lites L associated therewith (FIG. 1), and the description thereof is equally applicable to the substantially identical machine 12, whether the machine 12 operates individually upon individual lites L or collectively with the machine 10 simultaneously upon a single lite.

Figure 5:
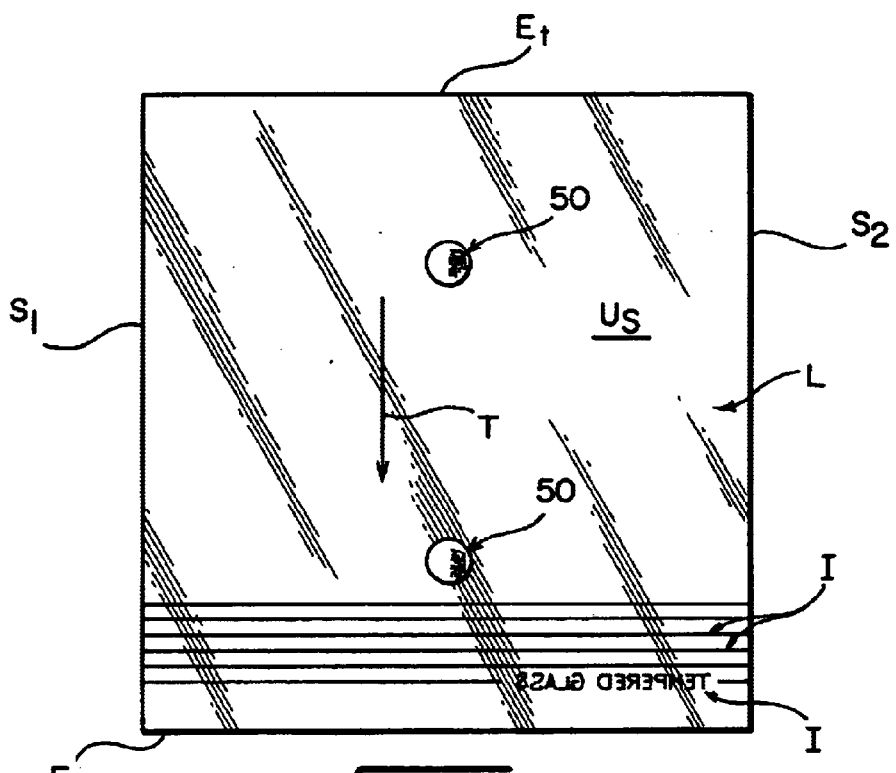
FIG. 5 is a top plan view of the lite of FIGS. 3 and 4, and illustrates the spacers upon an upper surface of the lite, and graphics and printing (upside down and backwards) upon the upper surface of the lite.
Figure 6:
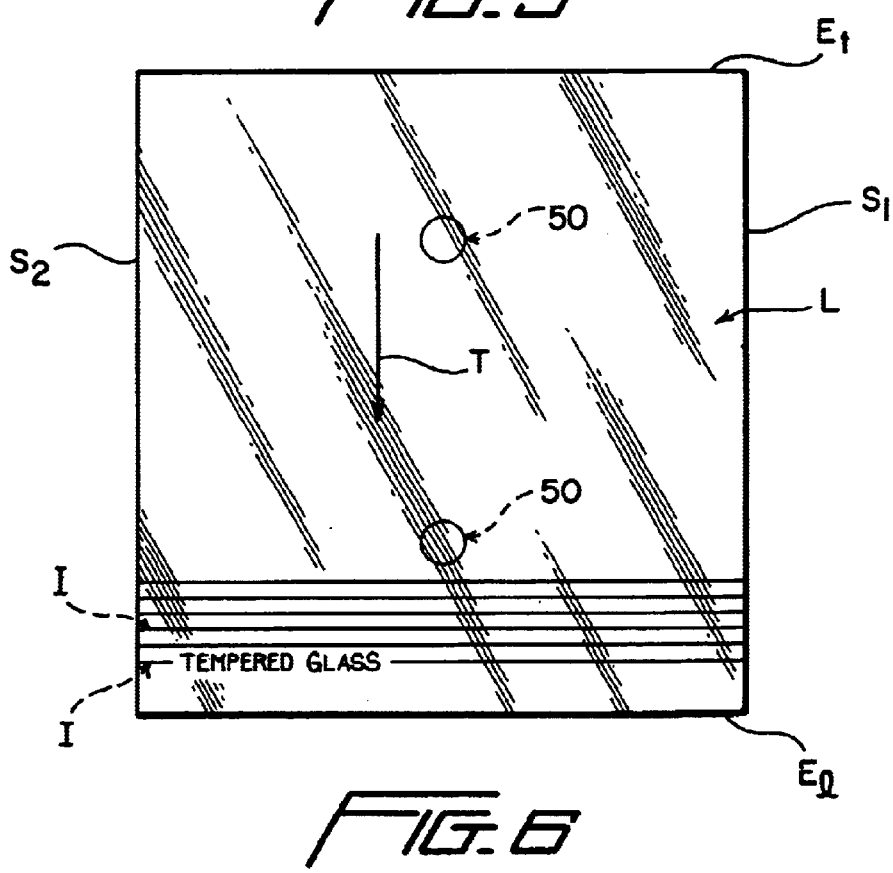
FIG. 6 is a top plan view of the lite of FIG. 5, and illustrates the opposite lower surface of the lite after the lite in FIG. 5 has been oriented lower side up.

Reference is made to FIGS. 5 and 6 of the drawings in which is illustrated one of the lites L which is of a generally rectangular configuration defined by an upper surface $U_s$ (FIG. 5), a lower surface $L_s$ (FIG. 6), side edges S1, S2, a leading edge $E_1$ and a trailing edge $E_t$. The direction of travel T of the lites L through the machine 10 has been superimposed upon the lite L in FIGS. 5 and 6 for reasons which will be more apparent hereinafter. The upper surface $U_s$ of each lite L includes indicia, designs and/or verbiage or printing I, such as the backward silkscreened words "TEMPERED GLASS" thereon, as well as appropriate designs (parallel lines) which can vary depending upon the particular end use application of the lites L. In the preferred embodiment of the invention, each lite L is preferably constructed from tempered glass and its end use is as a substantially horizontally oriented shelf in, for example, a refrigerator or the like.

Thus, in keeping with the first embodiment of the invention relative to the machines 10 and 12, the sheets, plates or lites L are fed in the direction T (FIG. 5) with the upper surface $U_s$ uppermost, but in end use applications the lower surface $L_s$ during manufacture becomes the upper surface in end use applications (FIG. 6).

The machine 10, as well as the machine 12, is a modified automatic label applicator of the type manufactured by Autolabe, a division of Booth Manufacturing Company of 3101 Industrial Avenue Two, Fort Pierce, Fla. 34946, and appropriately modified in keeping with the present invention.

As is best illustrated in FIG. 2 of the drawings, the machine 10 includes a conventionally supported shaft 21 upon which is removably mounted a reel 22 which is identical to a back-up or reserve reel 23 supported upon a shaft 24. Wound upon the reel 22 is a continuous ribbon or carrier 20 of relatively indeterminate length which will be described immediately hereinafter. The ribbon 20 is drawn over an idler roll 25 freely rotatable on a shaft (unnumbered) carried by an arm 26 which is biased by a spring (not shown) to provide appropriate tension to the ribbon 20. The ribbon 20 passes over another idler back-up roll 27 and is biased thereagainst by a spring 28. A pair of conventional photoelectric sensors 30, 31 are disposed on opposite sides of the ribbon 20. The photoelectric sensors 30, 31 include a conventional light source 30 and a conventional light sensor 31 responsive to the presence or absence of light ribbon 20 and lite L timed feeding under the control of a conventional solid state computer C. The sensors 30, 31 and the computer C are available from Autolabe and other sources. The ribbon 20 is partially entrained about an idler roller 32, passes over a guide bar 33 and subsequently is partially entrained about a sharp radiused nose 34 of a transfer bar 35 in an area of merger A between the path of travel T of the lites L and a path of travel T1 (FIG. 2) of a portion of the carrier 20 as it moves from right-to-left in FIG. 2 toward an area of merger A. The ribbon or carrier 20 carries a plurality of identical relatively thin circular spacers 50 which will be described hereinafter, and at the merger area A individual spacers 50 are removed from the ribbon 20 and are transferred to the upper surface $U_s$ of each lite L.

After each spacer 50 has been removed from the carrier 20 and has been applied to an associated lite L, the ribbon 20 continues travelling over a timed intermittently driven drive roller 36, idler rollers 37, 38, a continuous driven drive roller 40 and is eventually fed into a trash container 42 through a discharge pipe 41 under the influence of air blown into the discharge pipe 41 by a blower motor 43 via a duct 44. A spring-biased arm 45 biases a back-up roller 46 against the ribbon 20 to maintain the ribbon 20 taut whether being fed or stationary. When the ribbon 20 is stationary, the roller 40 simply slips against the surface of the ribbon 20.

A front edge sensor 47 and a rear edge sensor 48 are positioned in the merger area A and respectively detect the leading edge $E_1$ and the trailing edge $E_t$ of each lite L with appropriate signals therefrom being fed to the computer C for step-advancing the ribbon 20 through the intermittently driven drive roller 36 to successively apply the spacers 50 adjacent the leading edge $E_1$ and the trailing edge $E_t$ of each lite L. The sensors 47, 48 are preferably light sensors, such as the conventional sensors 30, 31, and preferably the sensors 47, 48 can be moved in a conventional manner individually to the left or right along the path of travel T to selectively vary the positions at which the spacers 50 are applied to the lites L.

During the transfer of each spacer 50 in the area of merger A, bristles of a brush 19 fixed appropriately adjacent the transfer bar 35 assures that each spacer 50 is forcefully adhered to the upper surface U of each lite L.

Figure 7:
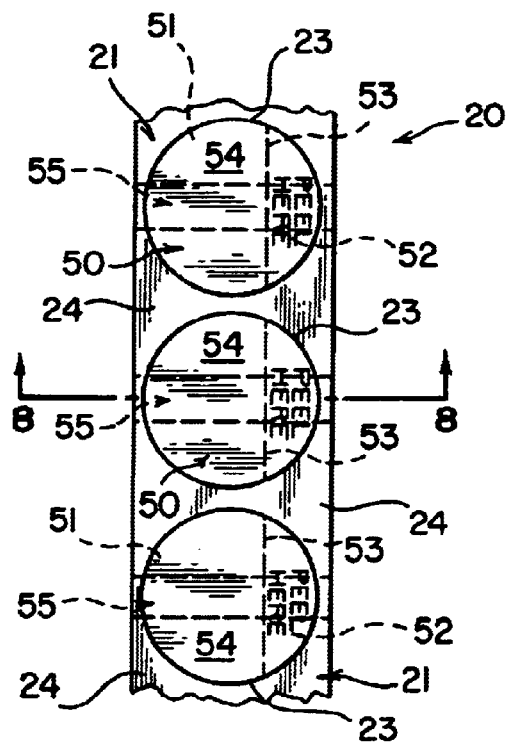
FIG. 7 is a fragmentary enlarged front elevational view of the ribbon or carrier from which each relatively thin spacer is removed, and illustrates a plurality of circular cut lines each defining a substantially circular spacer and in parallel broken lines a dark bar for sensor activation and attendant spacer-to-lite application purposes.
Figure 8:
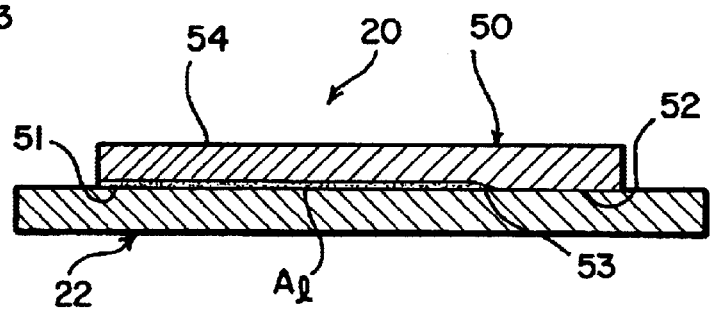
FIG. 8 is an enlarged cross-sectional view taken along line 8—8 of FIG. 7, and illustrates a first surface of one of the spacers in contact with a first surface of a second strip with a first surface area of the spacer being in adhesive adhering contact with the second strip and a second surface area of the spacer being in nonadhering contact with the second strip.

In FIGS. 7 and 8 of the drawings, a portion of the ribbon or carrier 20 is illustrated which initially includes a first relatively narrow strip of material 21 shown only in FIG. 7 and a second relatively narrow strip of material 22 (FIG. 8). In this embodiment of the invention, both strips 21, 22 are relatively translucent paper material of identical width with first surfaces thereof in abutting, contacting, substantially adhering relationship to each other. The first strip of material 21 includes a plurality of circular cut lines 23 extending substantially completely therethrough with each cut line 23 defining one of the relatively thin and flat spacers 50. The cut lines 23 are die cuts formed in a conventional manner, and once thus formed, a waste ribbon portion 24 (FIG. 7) is entirely removed from the second strip 22 leaving only the spacers 50 upon the second strip of material 22 (FIG. 8). Thus, in the final ribbon 20 (FIGS. 2 and 8), first strip portions or spacers 50 are retained upon the second strip 22 while the second strip portion or the waste strip portion 24 is removed.

Prior to uniting the first and second strips 21, 22, respectively, to each other, a first surface area 51 (FIG. 9) of each first strip portion or spacer 50 is provided with adhesive characteristics, such as low bond strength adhesive $A_1$. Typically, such adhesives AR are commonly used on Post-it® notes manufactured by 3M Corporation of st. Paul, Minn. The adhesive $A_1$ covers essentially the entire first or major surface area 51 of each spacer 50, while an adjacent minor surface area 52 separated from the first major surface area 51 by a line of demarcation 53 (FIGS. 8 and 9) lacks adhesive characteristics and possesses substantially nonadhering characteristics. As is best illustrated in FIG. 8, the low bond strength adhesive $A_1$ adheres each spacer 50 to the opposing surface of the second strip 22 at the major surface area 51, but the second surface area or minor surface area 52 is in nonadhering contact with the second strip 22. An upper surface 54 of each spacer 50 has also printed thereupon "PEEL HERE" or similar indicia for a purpose to be described more fully hereinafter.

Figure 3:
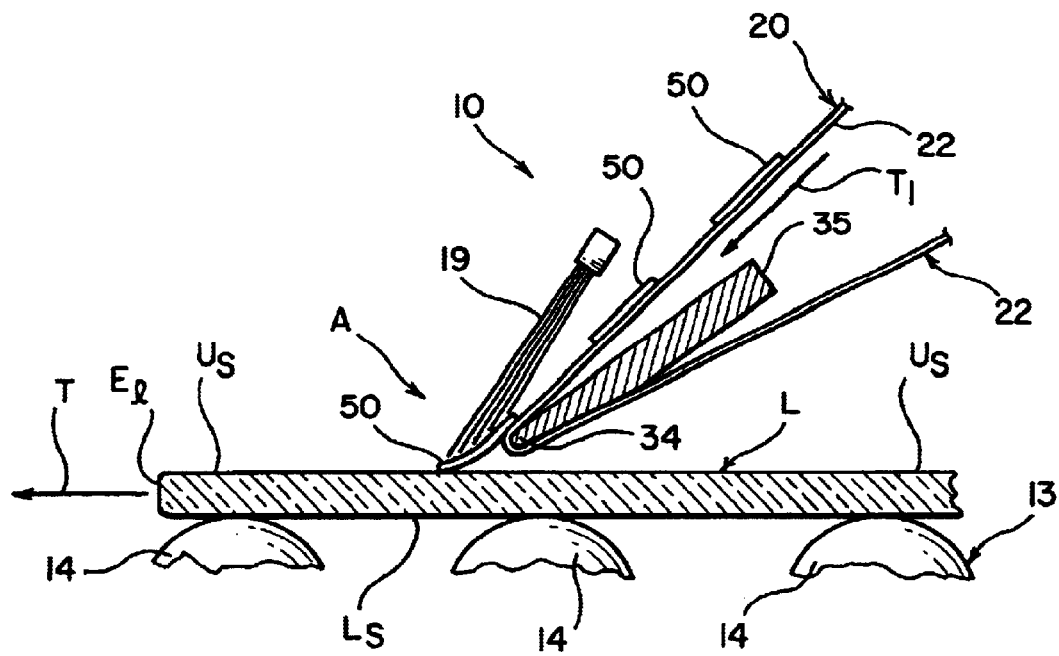
FIG. 3 is an enlarged fragmentary longitudinal cross-sectional view of the merger area between the paths of travel of the ribbon and spacers and the lites, and illustrates one of the spacers being transferred to an upper surface of a lite at a predetermined position relative to the leading edge of the lite as the lite travels from right-to-left.
Figure 4:
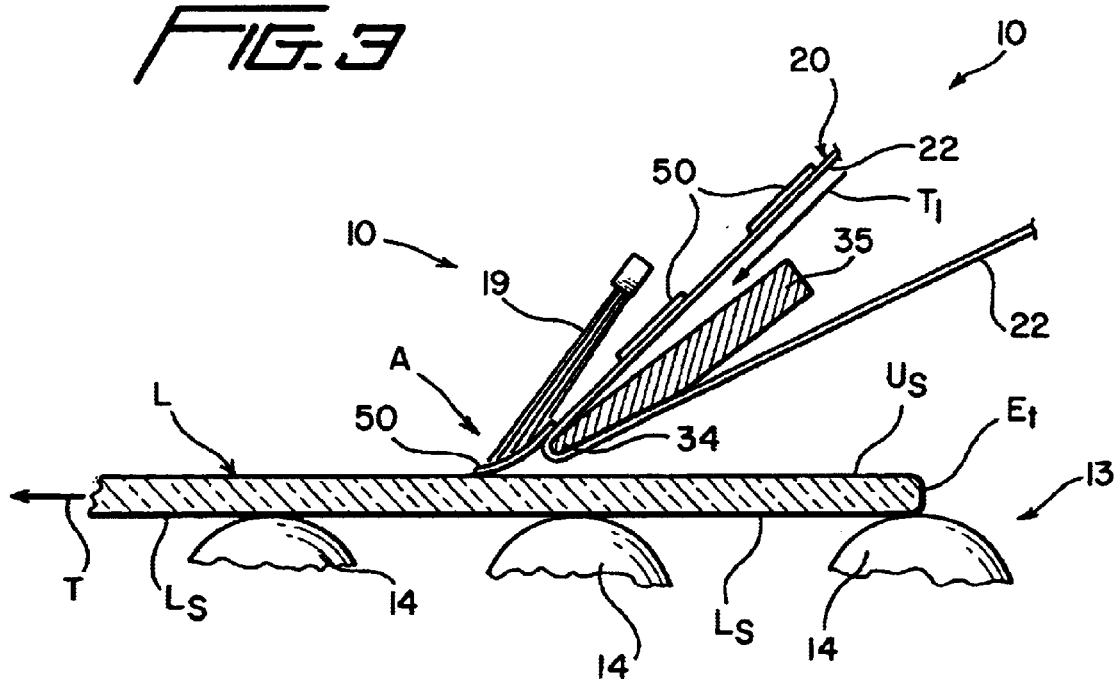
FIG. 4 is an enlarged fragmentary longitudinal cross-sectional view of the merger area between the paths of travel of the ribbon and spacers and the lites, and illustrates a second spacer being transferred from the ribbon to the upper surface of the same lite as that illustrated in FIG. 3 but in specified relationship to a trailing edge of the lite relative to the direction of travel.

A plurality of means 55 (FIGS. 7 and 8) are spaced from each other along the second strip 22 for detection by the sensors 30, 31 to effect timed removal of each spacer 50 from the ribbon 20 specifically from the second strip 22 in the area of merger A (FIGS. 2, 3 and 4). The means 55 are a plurality of black printed bands through which light essentially will not pass, whereas light will pass through the reminder of the ribbon 20 because of the relatively thin and translucent characteristics of the paper of the second strip 22 and the spacers 50.

Reference is made specifically to FIGS. 2, 3 and 4 of the drawings which collectively illustrate the manner in which two of the spacers 50, 50 (FIGS. 5 and 6) are applied to the upper surface $U_s$ of each of the lites L. As the lites L continuously travel from right-to-left in FIG. 2 along the path of travel T, the leading edge $E_1$ (FIG. 3) of a lite L will be sensed by the sensor 47 which is hardwired to the computer C. The computer C in turn signals a conventional drive mechanism D to rotate the drive roller 36 clockwise and thereby advance the tape 20 in the direction $T_1$. During this advancement, the very sharp or abrupt nose 34 of the transfer bar 35 creates an abrupt bend in the second strip 22 (FIG. 3), but the spacer 50 continues moving along the path $T_1$ toward and upon the upper surface $U_s$ of the lite L under the wiping action of the bristles of the brush 19 somewhat downstream from the leading edge $E_1$ of the lite L. The latter is a relatively abrupt and short advancement of the ribbon 20 because the next black timing bar 55 passing between the sensors 30, 31 transmits a signal to the computer C and the latter in turn signals the drive mechanism D to stop the drive rotation of the drive roller 36 which ceases advancement of the ribbon 20 in the direction $T_1$. As the trailing edge $E_t$ of the lite L is next sensed by the sensor 48, a signal is again transmitted to the computer C which in turn causes the step-advancement of the ribbon 20 via the drive mechanism D and the drive roller 36 during which the next succeeding spacer 50 (FIG. 4) is applied to the upper surface $U_s$ of the same lite L upstream, as viewed in the direction of travel T, from the trailing edge $E_t$. The feed of the second spacer 50 is also short and abrupt and is terminated upon the next succeeding black timing bar 55 passing between the sensors 30, 31 to again stop feed of the ribbon 20 via the computer C, the drive mechanism D and the drive roller 36. This sequence is repeated for each successive lite L, and the unending series of stop-and-go advancements of the ribbon 20 controlled by the sensors 30, 31 and 47, 48 apply the spacers 50 in spaced pairs to each upper surface $U_s$ of each lite L in the manner best illustrated in FIGS. 5 and 6 of the drawings.

Figure 9:
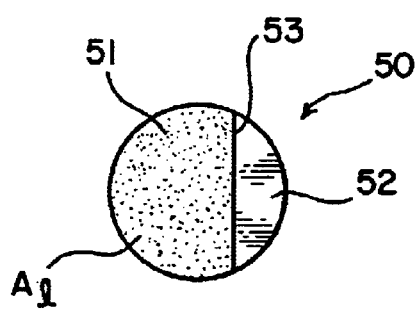
FIG. 9 is a bottom view of the first surface of one of the thin circular spacers, and illustrates a relatively large first adhering surface area, and a relatively smaller nonadhering second surface area.
Figure 10:
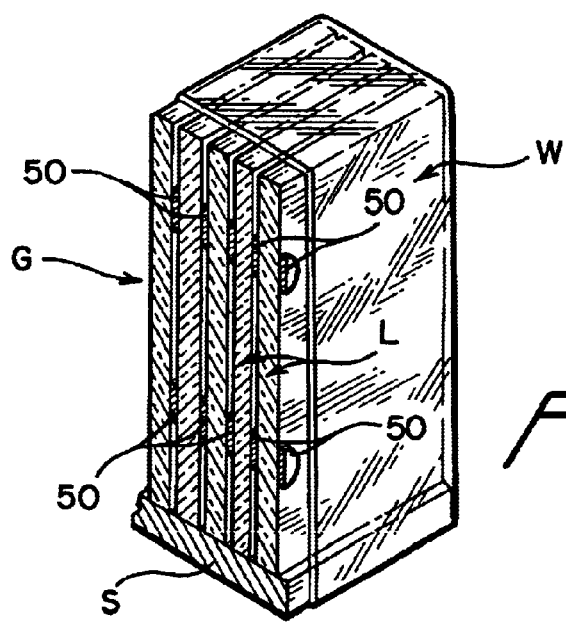
FIG. 10 is a fragmentary perspective diagrammatic view of a stack of lites, and illustrates each lite carrying a pair of thin spacers with each pair of thin spacers separating and protecting adjacent lites supported upon a pallet and wrapped in polymeric/copolymeric film.
Figure 11:
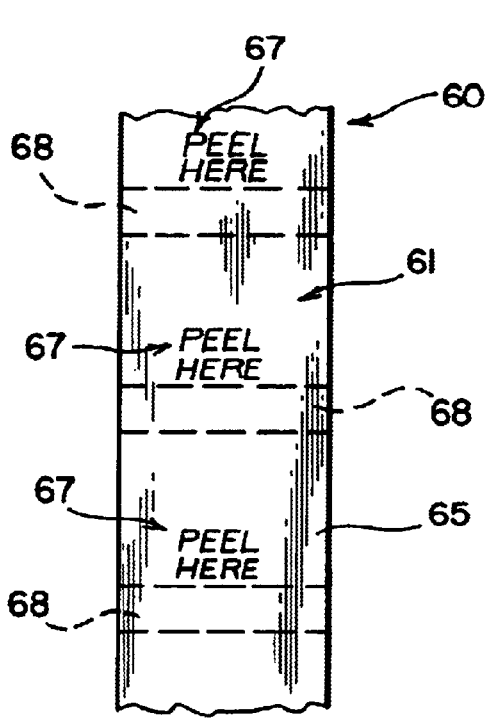
FIG. 11 is a fragmentary top plan view of another ribbon constructed in accordance with this invention, and illustrates indicia ("PEEL HERE") applied to a surface of a first narrow strip of static cling vinyl material and dark printed timing bars of indicia applied to an opposite surface of an underlying paper strip.
Figure 12:
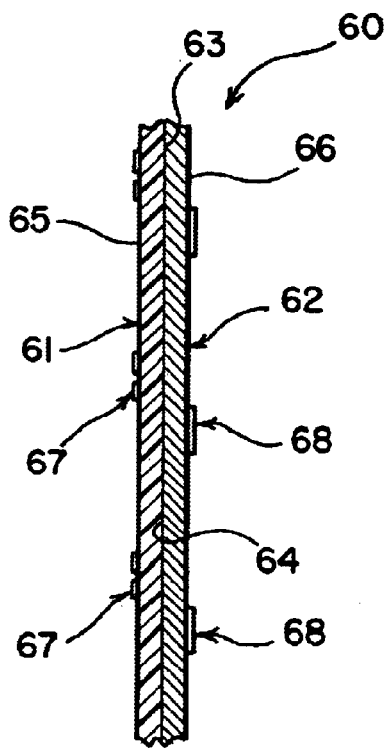
FIG. 12 is a fragmentary longitudinal cross-sectional view through the ribbon of FIG. 11, and illustrates the static cling vinyl strip and the paper strip in first-surface to first-surface adhering relationship over the entire abutting surfaces thereof.

A group or stack of the lites L is designated by the reference character G in FIG. 10, and the plurality of lites L thereof are each maintained in separated spaced relationship by the spacers 50 therebetween. This group or stack G of lites L are preferably supported upon a conventional pallet S and are conventionally overwrapped in relatively strong polymeric/copolymeric wrapping material W and are thus transported to a customer for end use manufacturing or installation purposes and subsequent retail end use. For example, if the stack or group G of spaced lites L are sent to a refrigerator manufacturer, the wrapping W would be removed, the spacers 50, 50 of each lite L would be removed, and the lites L installed, as, for example, refrigerator shelves. The nonadhering surface area 52 (FIGS. 8 and 9) of each spacer 50 provides a readily and easily grasped area/portion which is additionally identified by the words "PEEL HERE" (FIGS. 5 and 6). Therefore, each nonadhered portion 52 of each spacer 50 can be readily grasped and pulled to quickly and readily remove the spacers 50 from the lites L.

It is important to recognize that the uppermost surface 54 of each spacer 50 opposite the surface areas 51, 52 lacks any adhering or adhesive characteristics. In other words, the upper surface 54 of each spacer 50 possesses nonadhering characteristics and when the stack G is unwrapped, the lites L will not only readily separate one from another, but the spacers 50 will assuredly remain positioned as applied, namely, two spacers 50 per only each upper surface $U_s$ of each lite L absent the transfer of any spacer 50 to opposite abutting surfaces $L_s$ of adjacent lites L. Absent the latter, subsequent end users would be confronted with the problem of removing the spacers 50 from both upper and lower surfaces, $U_s$, $L_s$, respectively, of each lite L, rather than from the single surface $U_s$ which is more user friendly and less time-consuming. Though the spacers 50, 50 are mildly adhesively adhered to the upper surface $U_s$ of the lites L, it should be noted that the spacers 50, 50 and the backward silk screened indicia I are on the same upper side $U_s$ of each lite L, but in the end use position (FIG. 6) of each lite L, the lite L must be installed lower side $L_s$ up (FIG. 6) to render the indicia I readable. When the spacers 50, 50 are removed from each lite L prior to installation into a refrigerator, for example, there is no particular problem presented by the upper surface $U_s$ location of the spacers 50, 50. However, if the spacers 50, 50 are not removed and the lites L are installed as shelves, the now upper surface $U_s$ faces down and can present spacer removal problems, most significant of which is the cumbersome and awkward manipulative removal of the spacers 50 from below. The latter problem is effectively solved in a manner to be described subsequently with respect to FIGS. 18 and 19 of the drawings.

Reference is, however, first directed to another ribbon or carrier illustrated in FIGS. 11 through 14 of the drawings which is generally designated by the reference numeral 60. The ribbon 60 includes a first relatively narrow strip 61 of substantially translucent polymeric/copolymeric plastic material having static cling or electrostatic characteristics, such as conventional static cling vinyl, and a second relatively narrow strip 62 of substantially translucent paper material with respective first surfaces 63, 64 thereof being in abutting relatively weakly adhering relationship to each other. The strips 61, 62 adhere to each other by precoating the surface 64 of the paper strip 62 with an extremely weak bonding adhesive (not shown), such as the adhesive $A_1$ used in association with the spacers 50 (FIGS. 8 and 9). The adhesive $A_1$ is identical to that earlier described relative to adhesive used upon Post-it® notes manufactured by 3M Corporation of St. Paul, Minn. Opposite second surfaces 65, 66 of the respective strips 61, 62 carry respective indicia 67, 68. The indicia 67 are the words "PEEL HERE," or any equivalent thereof, though the indicia 67 need not necessarily be utilized in conjunction with the utilization of the ribbon 60. The indicia or timing stripes 68, however, constitute a plurality of means spaced from each other along the second surface 66 of the strip 62 which cooperate with the sensors 30, 31 (FIG. 2) to stop ribbon feed shortly after each spacer 50 has been applied to each lite L in response to the successive operation of the sensors 47, 48, as was described earlier herein. The timing strips or sensor-activating means 68 are relatively broad black printed stripes which block light transmission through the relatively translucent material of the strips 61, 62.

Figure 13:
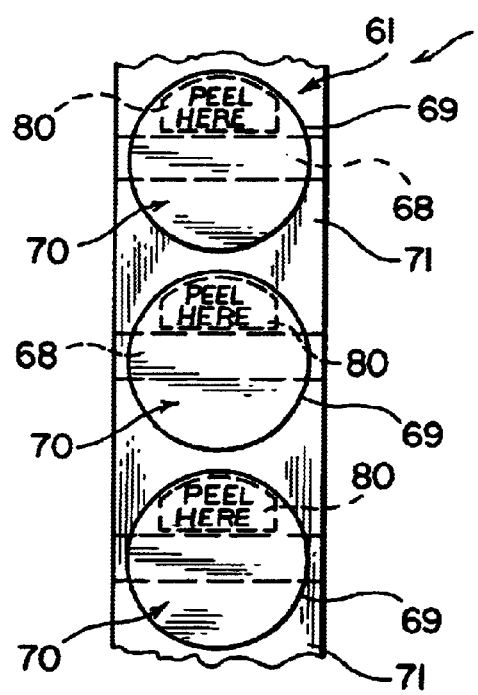
FIG. 13 is a fragmentary top plan view of the ribbon or carrier of FIG. 11, and illustrates the latter after circular die cuts have been made through the vinyl cling strip and smaller tab-forming die cuts have been made through the paper strip in the area beneath the "PEEL HERE" indicia.

The first strip 61 also includes a plurality of continuous circular die cut lines 69 (FIGS. 11 and 12) setting-off equally spaced successive first strip portions or spacers 70 of a circular configuration. As is best illustrated in FIG. 13, each dark timing stripe 68 is diametrically located relative to an associated spacer 70. The material of the strip 61 surrounding the spacers 70 is generally designated by the reference numeral 71 (FIG. 13) and constitutes a second strip portion or a waste strip portion of the strip 61 which is entirely removed incident to the utilization of the ribbon 60 in conjunction with the machines 10, 12, as is best illustrated in FIG. 15 of the drawings.

The strip 62 also includes a plurality of equally spaced successive die cut lines 72 (FIG. 14) defining relatively small tabs 80. Each cut line 72 includes an arcuate cut line portion 73, opposite parallel relatively short cut line portions 74, 75, and a cut line portion 76 adjacent and generally parallel to its associated dark timing stripe or bar 68. Each tab 80 underlies the "PEEL HERE" indicia 67, as is best viewed in FIG. 13.

Figure 14:
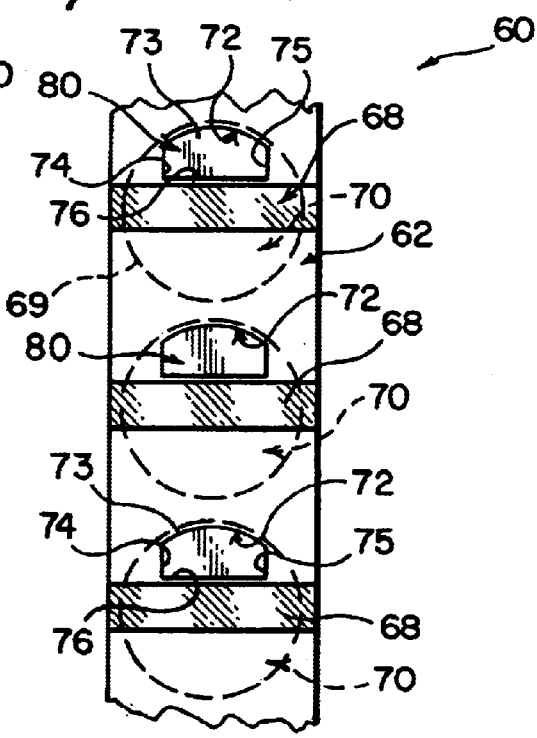
FIG. 14 is a fragmentary top plan view of the ribbon or carrier of FIG. 13, and illustrates the reverse side thereof with the tab-forming die cuts forming a paper tab immediately adjacent each dark printed timing bar.
Figure 17:
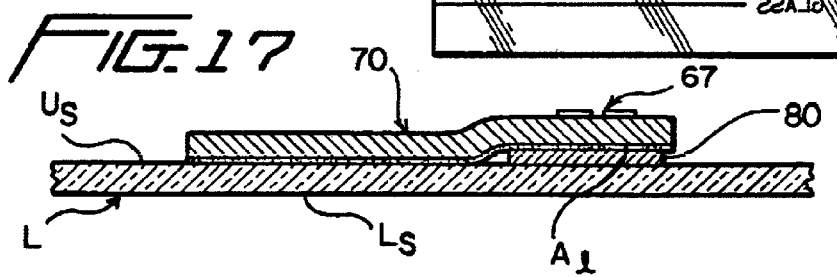
FIG. 17 is a highly enlarged cross-sectional view taken generally along line 17—17 of FIG. 16, and illustrates the "PEEL HERE" minor surface area or portion of the spacer in nonadhering relationship to the lite and the major surface area or portion of the spacer in electrostatic adhered relationship to the upper surface of the lite.

The ribbon 60 of FIGS. 13 and 14 with the waste strip portion 71 removed is wound upon a reel, such as the reel 22 of FIG. 2, and is threaded through the various components of the machine 10 identically as illustrated in FIG. 2 with respect to the ribbon 20. The overall operation of the machine 10 in conjunction with the ribbon 60 remains essentially the same as that heretofore described with respect to the ribbon 20. In this case the ribbon or carrier 60 is preferably wound upon the reel 22 such as the "PEEL HERE" portions of the spacers 70 are trailing as they approach the merge area A in the manner shown in FIG. 15 and are progressively stripped therefrom in the manner heretofore described in detail relative to the ribbon 20. However, due to the static cling characteristics of the static cling vinyl material, each negatively charged vinyl spacer 70 is attracted to the positively charged lite L and electrostatically adheres/statically clings thereto. During the application of each spacer 70, as is best illustrated in FIG. 15, the small tab 80 associated therewith is also removed from the strip 62. Since the tab 80 is made of paper, it prevents the overlying portion of each spacer 80 from electrostatically adhering or clinging to the lite L, as is best illustrated in FIG. 17 of the drawing. Accordingly, the spacers 70 can be readily removed by simply gripping the "PEEL HERE" areas or portions 80, pulling the same and removing the spacers 70 from the lites L.

Figure 15:
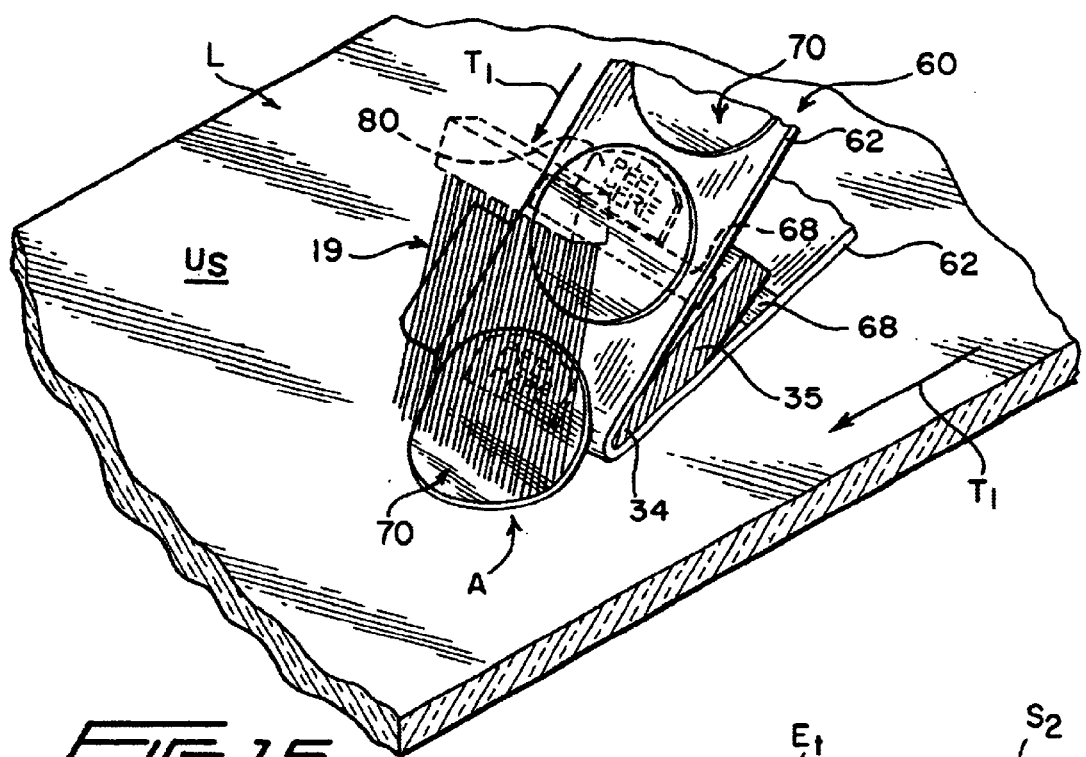
FIG. 15 is an enlarged fragmentary perspective view of the merger area of FIGS. 3 and 4, and illustrates one of the relatively thin circular spacers of the ribbon of FIGS. 13 and 14 being applied to a lite.

Though the ribbon 60 is illustrated in FIG. 15 with the "PEEL HERE" edges of each spacer 70 trailing, the ribbon 60 can be reversed upon the reel 22 such that it would be unwound with the "PEEL HERE" portion of each spacer leading in the direction of ribbon and lite travel, $T_1$ and T, respectively. In such case, the application of each spacer 70 to each lite L remains essentially the same as that heretofore described. Therefore, whether the "PEEL HERE" portion and small tab 80 of each spacer 70 is leading or trailing at the merge area A, the sharp nose 34 of the transfer bar 35 initiates separation of the spacers 70 from the strip 62 of the carrier 60 along with the tabs 80 thereof. Furthermore, as in the case of the lites L of FIGS. 5 and 6, the spacers 70 are also positioned upon the upper surface $U_s$ of the lite L of FIGS. 16 and 17 which is, of course, the lower side of the end use position of the lite L, noting the reverse and backward printing I of "TEMPERED GLASS" in FIG. 16.

Figure 16:
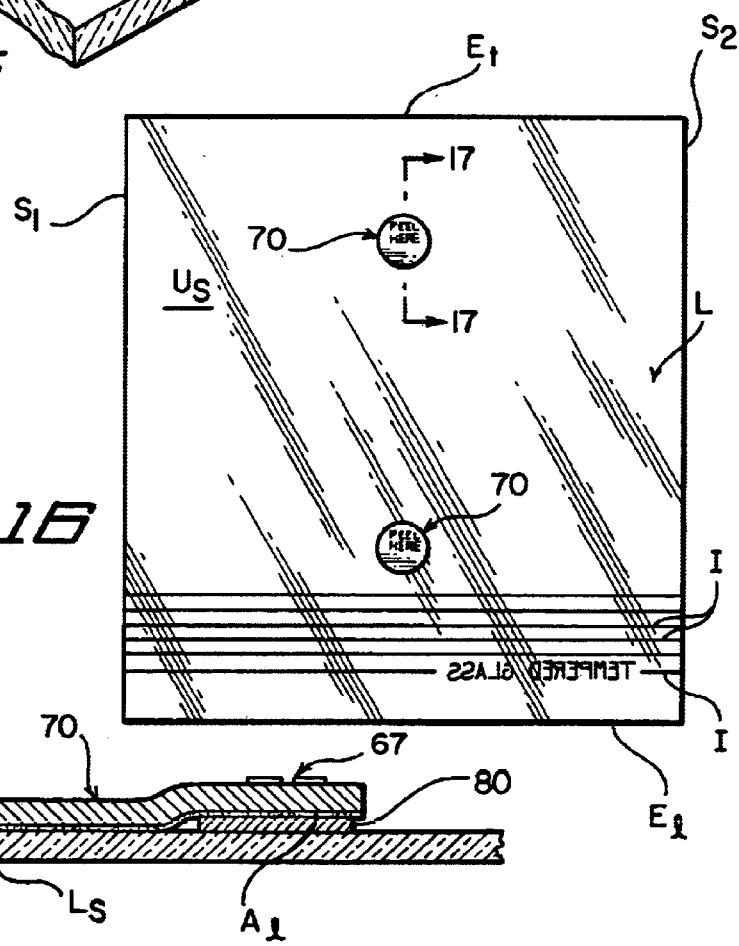
FIG. 16 is a top plan view of the lite of FIG. 15, and illustrates two of the thin spacers of FIG. 15 applied to an upper surface of the lite which also includes reverse printing.

The lites L of FIG. 16 are stacked in the manner heretofore described relative to FIG. 10 and, thus, are protected against scratching, cracking, etc. during shipment due to the spacing afforded adjacent plies L by the spacers 70.

Figure 18:
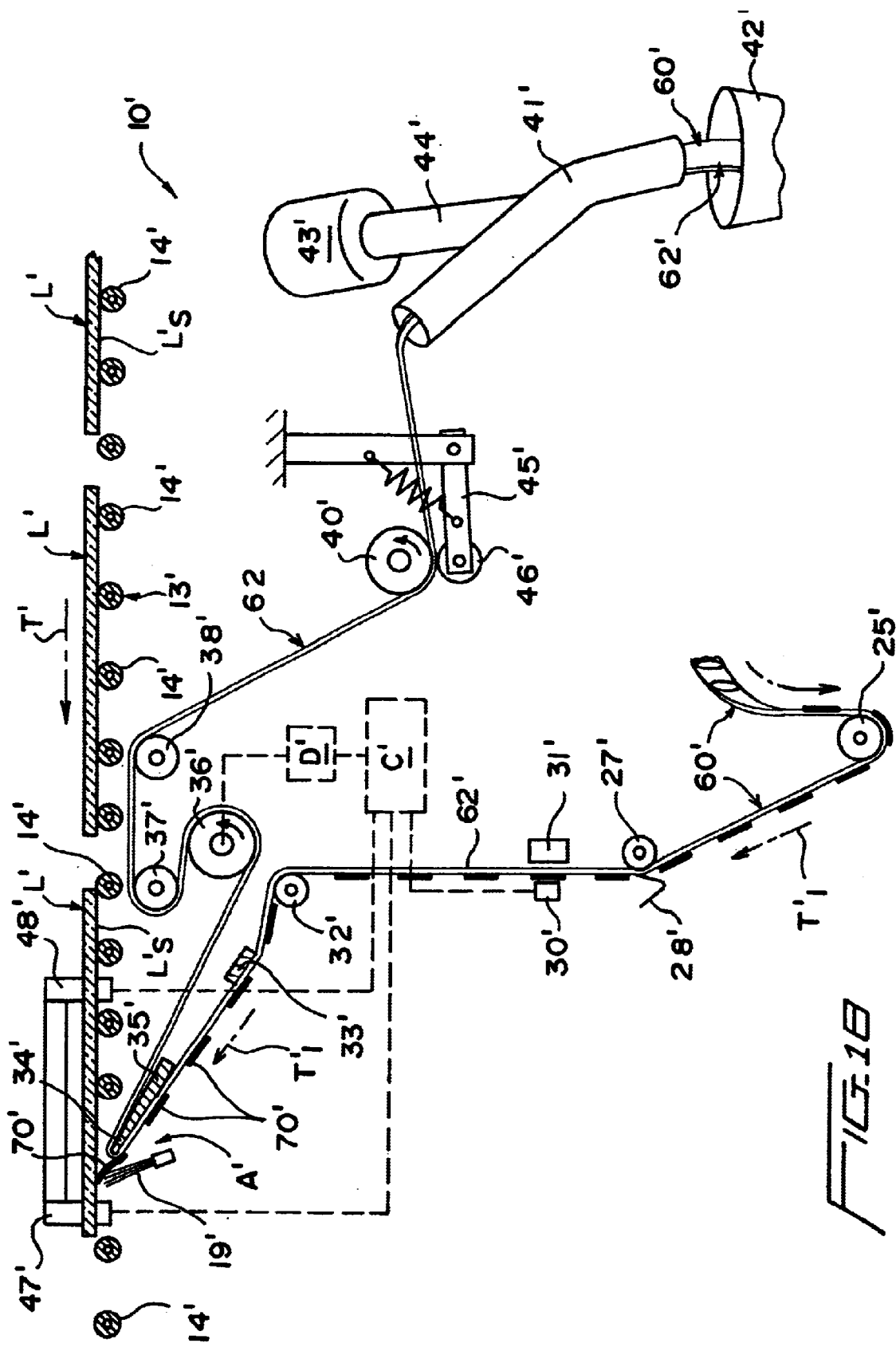
FIG. 18 is a schematic side elevational view of another machine constructed in accordance with this invention, and illustrates the manner in which thin spacers are applied to a lower surface of lites moving from right-to-left which results in the thin spacers being applied to the surface opposite that illustrated in FIGS. 3, 4, 5, and 6 of the drawings.
Figure 19:
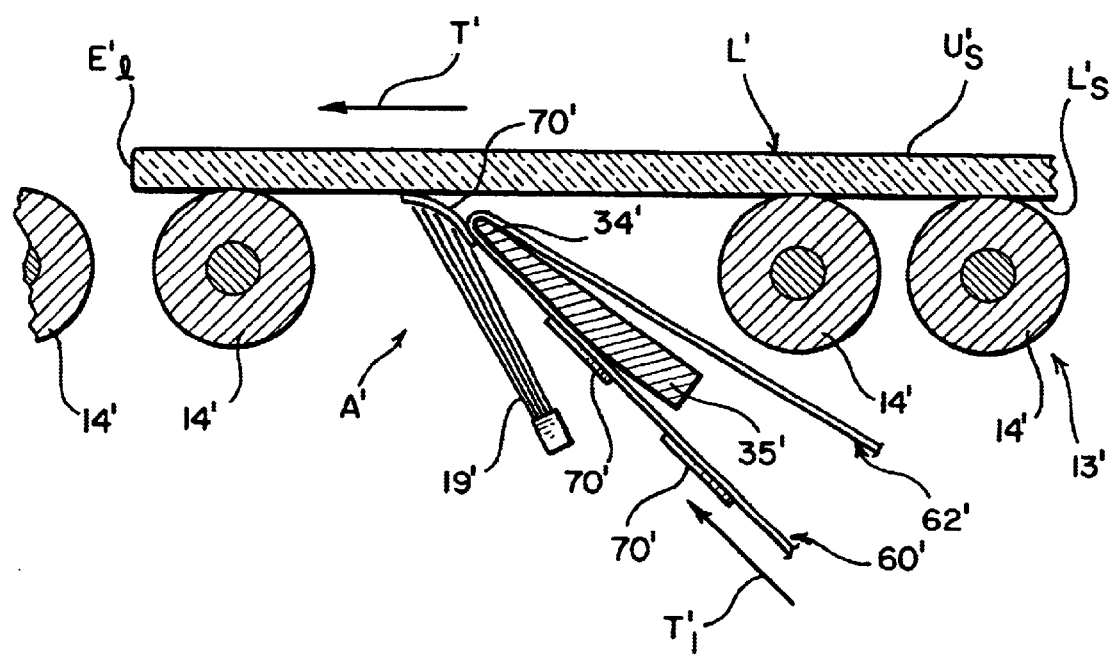
FIG. 19 is a highly enlarged schematic longitudinal cross-sectional view of an area of merger between the paths of travel of the lite and the spacers of the machine of FIG. 18, and illustrates a gap between adjacent conveyor rollers for accommodating transfer mechanisms of the spacer applying machine.

Another machine constructed in accordance with this invention is illustrated in FIG. 18 of the drawings, and identical components are identically numbered and primed with the overall machine being designated by the reference numeral 10'.

The machine 10' differs in one major aspect from the machines 10, 12, namely, the machine 10' is located beneath a conveyor 13'. The driven rollers 14' of the conveyor 13' feeds the lites L' from right-to-left along a path of travel designated by the headed arrow T'. One or more of the rollers 14' are eliminated at the area of merger A' between the path of travel T' of the lites L' and the path of travel $T'_1$ of the ribbon 60' and the spacers 70'. This allows the transfer bar 35' and the brush 19' to cooperate in the manner heretofore described relative to the machine 10 to transfer the spacers 70' to the lower surface $L'_s$ of each lite L' in the manner most readily apparent from FIG. 19 of the drawings. Therefore, in this manner the spacers 70' from the ribbon or carrier 60' (or the spacers 50 from the ribbon or carrier 20) can be selectively and successively applied to the lower surface $L'_s$ of each of the lites L' during the travel thereof. The importance of applying the spacers 50, 70 to the lower surface $L'_s$ of the lites L is the relationship thereof to the printed material or design indicia I applied to and carried by each of the lites L, L', such as the parallel design lines and the phrase "TEMPERED GLASS" appearing adjacent the leading edges $E_1$ of the lites L, L'. This is particularly important if an end use manufacturer does not, for example, remove the spacers 70' and installs the lites L' in, for example, a refrigerator for utilization as a horizontal shelf.

The end user manufacturer/purchaser in the case of the spacers 20 of FIG. 6 would have to reach beneath the lite or shelf L and remove the spacers 20 from the underside because, of course, the manufacturer/purchaser would install the lite or shelf L of FIG. 6 with the lower surface $L_s$ uppermost such that the design and the wording indicia I "TEMPERED GLASS" are properly oriented. Bottom surface removal of the spacers 20 or 70 or 70', etc. could be cumbersome, as noted earlier, but removal from the in-use upper surface $U'_s$ would be relatively straightforward. Accordingly, thought the machine 10' applies the spacers 50, 70, 70', etc. heretofore described to the lower surfaces $L'_s$ of the lites L' during production, in end use applications these spacers are located at the more accessible top surfaces of the lites L' and can be more readily removed therefrom.

As was described heretofore, the static cling vinyl spacers 70 are adhered to the lites L and stacked in the manner heretofore described relative to the spacers 50 of FIG. 10. However, the spacers 70 at times might transfer from the surface of the lite L to which they were specifically applied to the surface of an adjacent lite L, particularly if the wrap W is relatively tight, as it must be to avoid scratching, breakage, etc. Should such unintended spacer transfer occur, the adjacent "transferee" lite might have, for example, two spacers 70, 70 on one surface, a single spacer on the opposite surface, and adjacent "transferor" spacer would have only one spacer on the opposing surface. However, in further accordance with this invention, such inadvertent transfer of static cling vinyl spacers 70 from the upper surface $U_s$ of one lite L to the adjacent lower surface $L_s$ of a next adjoining, stacked lite is prevented from occurring by applying coating means or equivalent means upon the upper surface 65 (FIGS. 11 and 12) of the vinyl cling strip 61 after the indicia 67 has been applied thereto. One example of such means is a coating of ultraviolet material which is surface coated over the entire surface 65 and cured by an ultraviolet light. This "kills" or suppresses the static properties of the surface 65 and thus keeps each spacer 70 from transferring from the intended lite (FIG. 17) to the adjacent lite which it abuts when stacked in the manner illustrated in FIG. 10. Obviously, since the pairs of spacers adhered to the upper surface $U_s$ of each lite L remain adhered thereto and do not transfer to the lower surfaces $L_s$ of an adjacent lite, the lites easily separate and, of course, spacers need but be removed from a single surface during end use applications.

In lieu of the ultraviolet coating, enamel paint or a water-based coating, suitably dried, can be applied over the surface 65 (FIGS. 11 and 12) thereby preventing the unintended transfer of the spacer 70.

Although a preferred embodiment of the invention has been specifically illustrated and described herein, it is to be understood that minor variations may be made in the apparatus without departing from the spirit and scope of the invention, as defined the appended claims.

We claim:

1. A ribbon having portions removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions in spaced relationship to each other which are adapted to be subsequently entirely removed from said second strip, a plurality of printing means spaced from each other along said second strip for activating a sensor to effect timed removal of the first strip portions from the second strip during end use applications, each first strip portion first surface includes first and second surface areas, each first surface area being in substantially adhering relationship with said second strip first surface, and each second surface area being in substantially nonadhering relationship with said second strip first surface thereby adapting said first strip portions for ready removal from associated articles to which the same are end use applied.

2. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portion in spaced relationship to each other which are adapted to be subsequently entirely removed from said second strip, a plurality of printing means spaced from each other along said second strip for activating a sensor to effect timed removal of t e first strip portions from the second strip during end use applications, first strip portion first surface includes first and second surface areas, each first surface area being in substantially adhering relationship with said second strip first surface, each second surface area being in substantially nonadhering relationship with said second strip first surface thereby adapting said first strip portions for ready removal from associated articles to which the same are end use applied, and each first surface area includes adhesive characteristics.

3. A ribbon having portion removed therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions in spaced relationship to each other which are adapted to be subsequently entirely removed from said second strip, a plurality of printing means spaced from each other along said second strip for activating a sensor to effect timed removal of the first strip portions from the second strip during end use applications, each first strip portion first surface includes first and second surface areas, each first surface area being in substantially adhering relationship with said second strip first surface, each second surface area being in substantially nonadhering relationship with said second strip first surface thereby adapting aid first strip portions for ready removal from associated articles to which the same are end use applied, and each first surface area includes static cling characteristics.

4. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions in spaced relationship to each other which are adapted to be subsequently entirely removed from said second strip, a plurality of printing means spaced from each other along said second strip for activating a sensor to effect timed removal of the first strip portions from the second strip during end use applications, each first strip portion first surface includes first and second surface areas, each first surface area being in substantially adhering relationship with said second strip first surface, each second surface area being in substantially nonadhering relationship with said second strip first surface thereby adapting said first strip portions for ready removal from associated articles to which the same are end use applied, each first surface area includes adhesive characteristics, and each second surface area excludes adhesive characteristics.

5. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions in spaced relationship to each other which are adapted to be subsequently entirely removed from said second strip, a plurality of printing means spaced from each other along said second strip for activating a sensor to effect timed removal of the first strip portions from the second strip during end use applications, each first strip portion first surface includes first and second surface areas, each first surface area being in substantially adhering relationship with said second strip first surface, each second surface area being in substantially nonadhering relationship with said second strip first surface thereby adapting aid first strip portions for ready removal from associated articles to which the same are end use applied, each first and second surface areas include adhesive characteristics, and means for covering the adhesive characteristics of the second surface areas.

6. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions in spaced relationship to each other which are adapted to be subsequently entirely removed from said second strip, a plurality of printing means spaced from each other along said second strip for activating a sensor to effect timed removal of the first strip portions from the second strip during end use applications, each first strip portion first surface includes first and second surface areas, each first surface area being in substantially adhering relationship with said second strip first surface, each second surface area being in substantially nonadhering relationship with said second strip first surface thereby adapting aid first strip portions for ready removal from associated articles to which the same are end use applied, and said first and second strips are both paper.

7. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions which are adapted to be subsequently entirely removed from said second strip, and a plurality of cut lines substantially though said second strip of material setting-off successive second strip portions of a smaller size than said first strip portions which are each associated with one of said first strip portions and are adapted to be removed therewith upon the removal of each first strip portion from said second strip upon end use applications.

8. The ribbon as defined in claim 7 including a plurality of means spaced from each other along at least one of said first and second strips for activating a sensor to effect timed unified removal of the first and second strip portions from the second strip during end use applications.

9. The ribbon as defined in claim 7 including a plurality of means spaced from each other along at least one of said first and second strips for activating a sensor to effect timed unified removal of the first and second strip portions during end use applications, and said sensor activating means is carried by said second strip.

10. The ribbon as defined in claim 7 including a plurality of means spaced from each other along at least one of said first and second strips for activating a sensor to effect timed unified removal of the first and second strip portions during end use applications, and said sensor activating means is carried by said second strip second surface.

11. The ribbon as defined in claim 1 including a plurality of means spaced from each other along at least one of said first and second strips for activating a sensor to effect timed unified removal of the first and second strip portions during end use applications, and one of said plurality of sensor activating means is associated with each associate first and second strip portions.

12. The ribbon as defined in claim 1 including a plurality of means spaced from each other along at least one of said first and second strips for activating a sensor to effect timed unified removal of the first and second strip portions during end use applications, and said sensor activating means is indicia carried by said second strip.

13. The ribbon as defined in claim 1 including a plurality of means spaced from each other along at least one of said first and second strips for activating a sensor to effect timed unified removal of the first and second strip portions during end use applications, and said sensor activating means is printing carried by said second strip.

14. The ribbon as defined in claim 1 including a plurality of means spaced from each other along at least one of said first and second strips for activating a sensor to effect timed unified removal of the first and second strip portions during end use applications, and said sensor activating means is printed indicia carried by said second strip.

15. The ribbon as defined in claim 1 wherein each first strip portion first surface includes first and second surface areas, each first strip portion first surface area being in substantially adhering relationship with said second strip first surface including a first surface area of each second strip portion whereby said first and second strip portions are removed simultaneously and unified during end use applications.

16. A ribbon having portion removable therefrom during end use applications comprising first and second relatively narrow strips of material, said strips of material each having a first surface with said first surfaces being in substantially abutting relationship, said strips of material each having a second surface opposite the respective first surface, a plurality of cut lines substantially through said first strip of material setting-off successive first strip portions which are adapted to be subsequently entirely removed from said second strip, a plurality of cut lines substantially through said second strip of material setting-off successive second strip portions of a smaller size than said first strip portions which are each associated with one of said first strip portions and are adapted to be removed therewith upon the removal of each first strip portion from said second strip upon end use applications, and said first strip of material possesses static cling characteristics.

17. The ribbon as defined in claim 16 wherein said first strip portions include a peripheral edge, and each second strip portion is disposed inboard and adjacent an associated peripheral edge.

18. The ribbon as defined in claim 15 including a plurality of means spaced from each other along at least one of said first and second strips for activating a sensor to effect timed unified removal of the first and second strip portions during end use applications.

19. The ribbon as defined in claim 16 including a plurality of means spaced from each other along at least one of said first and second strips for activating a sensor to effect timed unified removal of the first and second strip portions during end use applications, and said sensor activating means is carried by said second strip.

20. The ribbon as defined in claim 15 including a plurality of means spaced from each other along at least one of said first and second strips for activating a sensor to effect timed unified removal of the first and second strip portions during end use applications, and said sensor activating means is carried by said second strip second surface.

21. The ribbon as defined in claim 15 including a plurality of means spaced from each other along at least one of said first and second strips for activating a sensor to effect timed unified removal of the first and second strip portions during end use applications, and one of said plurality of sensor activating means is associated with each associate first and second strip portions.

22. The ribbon as defined in claim 15 including a plurality of means spaced from each other along at least one of said first and second strips for activating a sensor to effect timed unified removal of the first and second strip portions during end use applications, and said sensor activating means is indicia carried by said second strip.

23. The ribbon as defined in claim 15 including a plurality of means spaced from each other along at least one of said first and second strips for activating a sensor to effect timed unified removal of the first and second strip portions during end use applications, and said sensor activating means is printing carried by said second strip.

24. The ribbon as defined in claim 18 wherein said second strip portions are each substantially smaller than said first strip portions, said first strip portions include a peripheral edge, and each second strip portion is disposed inboard and adjacent an associated peripheral edge.

* * * * *